United States Patent
Wang et al.

(10) Patent No.: US 8,406,948 B2
(45) Date of Patent: Mar. 26, 2013

(54) PLUG-IN HYBRID ELECTRIC VEHICLE AND METHOD OF CONTROL FOR PROVIDING DISTANCE TO EMPTY AND EQUIVALENT TRIP FUEL ECONOMY INFORMATION

(75) Inventors: Qing Wang, Canton, MI (US); Hai Yu, Canton, MI (US); Anthony Mark Phillips, Northville, MI (US); Ming Lang Kuang, Canton, MI (US); Xiaoyong Wang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 12/941,126

(22) Filed: Nov. 8, 2010

(65) Prior Publication Data

US 2012/0116620 A1    May 10, 2012

(51) Int. Cl.
*B60W 20/00*    (2006.01)
*B60W 40/00*    (2006.01)
(52) U.S. Cl. ............................ 701/22; 701/123; 340/438
(58) Field of Classification Search .................... None
See application file for complete search history.

(56) References Cited

U.S. PATENT DOCUMENTS

| | | | |
|---|---|---|---|
| 5,301,113 A * | 4/1994 | To et al. | 701/123 |
| 6,314,347 B1 | 11/2001 | Kuroda et al. | |
| 6,940,401 B2 * | 9/2005 | Taxon | 340/450.2 |
| 7,360,615 B2 | 4/2008 | Salman et al. | |
| 2005/0228553 A1 | 10/2005 | Tryon | |
| 2009/0198396 A1 | 8/2009 | Rodriguez et al. | |
| 2011/0046834 A1 * | 2/2011 | Grider et al. | 701/22 |
| 2011/0118921 A1 * | 5/2011 | Park et al. | 701/22 |

FOREIGN PATENT DOCUMENTS

| | | |
|---|---|---|
| JP | 2002274219 A | 9/2002 |
| JP | 2009055675 A | 3/2009 |
| JP | 2009241926 A | 10/2009 |
| JP | 2010038754 | 2/2010 |
| WO | 2009028357 A1 | 3/2009 |
| WO | 2009031021 A2 | 3/2009 |
| WO | 2009081234 A1 | 7/2009 |

* cited by examiner

*Primary Examiner* — Michael J. Zanelli
(74) *Attorney, Agent, or Firm* — David B. Kelley; Brooks Kushman P.C.

(57) ABSTRACT

A powertrain for a hybrid electric vehicle (HEV) such as a plug-in hybrid electric vehicle (PHEV) includes an engine, a fuel tank, a battery, and a controller. The controller is configured to determine a distance to empty value as a sum of fuel in the fuel tank and a battery equivalent amount of fuel, the sum multiplied by an average fuel economy of the PHEV based on a driving condition of the vehicle.

20 Claims, 3 Drawing Sheets

PLUG-IN HYBRID ELECTRIC VEHICLE AND METHOD OF CONTROL FOR PROVIDING DISTANCE TO EMPTY AND EQUIVALENT TRIP FUEL ECONOMY INFORMATION

BACKGROUND

1. Technical Field

The present invention relates to a plug-in hybrid electric vehicle and a method of control.

2. Background Art

Vehicles provide real-time information to a vehicle message console to keep the driver informed of the operating status of the vehicle. The 'Distance to Empty' ("DTE") and 'Trip Fuel Economy' ("trip FE") information is found to be highly useful by drivers. Drivers use the DTE and trip FE information to evaluate vehicle performance, minimize trip cost, carry out maintenance, etc. Highly-accurate DTE and trip FE information conveys a positive impression on the vehicle quality. DTE and trip economy/efficiency readouts are standard features on conventional vehicles, hybrid electric vehicles ("HEVs"), and electric vehicles ("EVs"). A problem is that plug-in hybrid electric vehicles ("PHEVs") lack accurate DTE and trip FE readouts.

SUMMARY

In at least one embodiment, a powertrain for a hybrid electric vehicle ("HEV") such as a plug-in hybrid electric vehicle ("PHEV") is provided. The powertrain includes an engine, a fuel tank, a battery, and a controller. The controller is configured to determine a distance to empty value as a sum of fuel in the fuel tank and a battery equivalent amount of fuel, the sum multiplied by an average fuel economy of the vehicle based on a driving condition of the vehicle.

The controller may determine the battery equivalent amount of fuel as a function of an equivalence factor based on a current state of charge (SOC) of the battery and the driving condition.

The controller may identify the driving condition of the vehicle from a plurality of possible driving conditions based on sensed information of the vehicle. Each possible driving condition may be respectively associated with an average fuel economy of the vehicle.

The controller may determine an equivalent trip fuel economy value as the distance traveled by the vehicle divided by the sum of used fuel from the fuel tank and a battery equivalent amount of used fuel from the battery. In this case, the controller may determine the battery equivalent amount of used fuel as a function of an equivalence factor based on a current state of charge (SOC) of the battery and the driving condition.

The controller may determine an equivalent amount of fuel saved from battery depletion value as being the sum of the negative of the used fuel from the fuel tank and the quotient of the distance traveled by the vehicle divided by the equivalent trip fuel economy value.

In at least one embodiment, a controller for a vehicle is provided. The controller is configured to determine a distance to empty value as a sum of fuel in a fuel tank and a battery equivalent amount of fuel, the sum multiplied by an average fuel economy of the vehicle based on a driving condition of the vehicle. The controller may determine an equivalent trip fuel economy value as the distance traveled by the vehicle divided by the sum of used fuel from the fuel tank and a battery equivalent amount of used fuel from a battery.

In at least one embodiment, a method is provided. The method includes determining an amount of fuel in a fuel tank of a hybrid electric vehicle and determining a battery equivalent amount of fuel in a battery of the vehicle. The method further includes sensing the vehicle with sensor hardware as the vehicle is being driven to determine a current driving condition of the vehicle. The method further includes determining a distance to empty value as a sum of the fuel in the fuel tank and the battery equivalent amount of fuel, the sum multiplied by an average fuel economy of the vehicle based on the current driving condition. The method may further include determining an equivalent trip fuel economy value as the distance traveled by the vehicle divided by the sum of used fuel from the fuel tank and a battery equivalent amount of used fuel from the battery.

DETAILED DESCRIPTION

Figure 1:
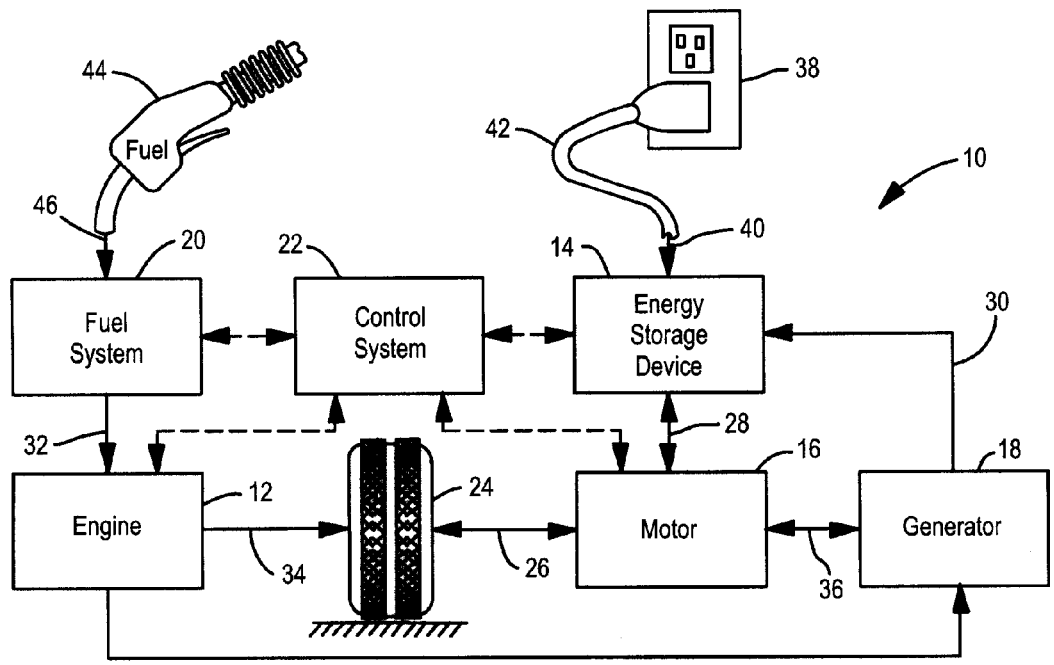
FIG. 1 illustrates a block diagram of an exemplary plug-in hybrid electric vehicle ("PHEV")

Detailed embodiments of the present invention are disclosed herein; however, it is to be understood that the disclosed embodiments are merely exemplary of the present invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

An embodiment of the present invention provides a method of providing accurate 'Distance to Empty' ("DTE") and 'Trip Fuel Economy' ("trip FE") information for plug-in hybrid electric vehicles ("PHEVs").

The calculation of DTE and trip FE involves energy conversion. DTE and trip economy/efficiency calculations are much easier for conventional vehicles, hybrid electric vehicles ("HEVs"), and electric vehicles ("EVs") than for PHEVs because the former vehicle types are constrained to consume only one energy source whereas PHEVs have two energy sources. The constraint of only one energy source for a regular HEV is true because its battery capacity is usually small and negligible compared to the energy size of its fuel tank. Additionally, its state of charge ("SOC") is relatively very narrow and SOC balancing is required during trips.

On the other hand, as noted, a PHEV has two sources of energy: a fuel tank and a large capacity battery, which both are refillable. From the vehicle driver's point of view, 'fuel' and 'electricity' can be viewed as two types of currency that can be traded for 'driving distance' under the PHEV's intelligent energy depletion control strategy.

Existing calculation methods of HEVs and EVs may be simply combined to estimate the DTE and trip FE for a PHEV. For instance, this estimation is done by assuming that the PHEV starts with a charge-sustaining HEV mode (i.e., only fuel is being used—electricity is not being used) until running out of fuel then followed by an EV mode (i.e., only electricity is being used—fuel is not being used) until the battery SOC depletes to its minimal level. Alternatively, the order is reversed whereby the PHEV starts with the EV mode followed by the HEV mode.

However, this estimation is an oversimplified approach as it ignores that PHEV operation typically includes the following operation modes: charge-sustaining; and charge-depleting, where the charge-depleting mode includes an EV mode and a blended mode. The blended mode is a particular charge-depleting mode with engine assistance (i.e., with fuel consumption).

The SOC depletion strategy of a PHEV has dominant impact on the overall system operation efficiency, and thereby it dramatically affects the DTE and trip FE calculations. It is the PHEV's blended mode control strategy and the varying driving condition that make the estimation much more challenging.

The equivalence conversion between fuel and electricity in a PHEV can be viewed similarly as the 'currency exchange rate' in a variable dynamic market. The rate is a complicated function of powertrain operation efficiencies. Its variation is tied to the driving condition, energy management strategy, and the SOC state. The predicted DTE and trip FE could be completely different for the same amount of Fuel and SOC consumed (or remained).

Based on the foregoing, the calculation of DTE and trip FE for a PHEV has to be dynamically updated based on the following factors: driving conditions; energy management strategy in the vehicle system controller; and battery SOC.

Regarding the driving condition factor, the powertrain operation efficiency is constantly influenced by road-types, driving style, and traffic conditions. These driving characteristics can be represented by typical driving patterns. The DTE and trip FE vary if the driving pattern changes. Thus, the DTE and trip FE calculations should be adaptively updated to match the on-going driving pattern.

Regarding the energy management strategy factor, a PHEV has a blended mode control strategy that optimizes the charge depletion along the driving trip. The strategy varies if the driving pattern changes. As energy management dominates the fuel economy, it also influences the DTE and trip FE calculations.

Regarding the battery SOC factor (i.e., the SOC state), a PHEV operates with large SOC variations. Different depth of SOC depletion corresponds with different energy conversion rates because energy management decisions are scheduled as a function of SOCs.

To solve the aforementioned challenges, an embodiment of the present invention provides a method to accurately calculate the following two readouts online for a PHEV: Distance to Empty (DTE) (i.e., the remaining travel distance without refueling or re-charging); and Equivalent Trip Fuel Economy ("equivalent trip FE") (i.e., energy efficiency).

The equivalent trip FE readout is explained as follows. Energy efficiency for a trip that has occurred in a conventional vehicle or an HEV is expressed as trip fuel economy in 'miles per gallon' (e.g., MPG). Energy efficiency for a trip that has occurred in an EV is expressed in 'watt-hours per mile' (e.g., Wh/ml). As indicated, a PHEV does both fuel-depletion in MPG and charge-depletion in Wh/ml. Thus, in a PHEV, a first trip FE readout in MPG and a second trip FE readout in Wh/ml could be provided to the driver. However, as a single trip FE readout provides simplification and as MPG is much more widely known and understood by the general consumer than Wh/ml, it is desired to provide the equivalent trip FE in one unit as an informative index on how efficiently the PHEV has performed in fuel saving.

That is, the equivalent trip FE is expressed in MPG with the charge-depletion in Wi/ml component being converted to fuel-depletion in MPG. To this end, in the method of the embodiment of the present invention, the 'electricity' consumed (or remained) is converted or mapped into an equivalent amount of 'fuel' in terms of achieving the same amount of trip distance. The conversion uses accurate 'SOC to Fuel' equivalence factors.

Referring now to FIG. 1, a schematic of an exemplary PHEV 10 is shown. PHEV 10 includes an engine 12, an energy storage device 14, a motor 16, a generator 18, a fuel system 20, and a controller 22.

As an example, engine 12 comprises an internal combustion engine, energy storage device 14 comprises one or more electric batteries and/or capacitors, and motor 14 comprises an electric motor. Engine 12 is configured to consume a liquid fuel (e.g., gasoline) to produce a motor output. Energy storage device 14 is configured to output and receive electrical energy and store received electrical energy. Motor 16 is configured to consume electrical energy to produce a motor output.

PHEV 10 may utilize a variety of different operational modes depending on operating conditions encountered by the PHEV. Some of these modes enable engine 12 to be maintained in an off state where combustion of fuel at the engine is discontinued. For example, under select operating conditions, motor 16 may propel the vehicle via drive wheel 24 as indicated by arrow 26 while engine 12 is deactivated.

During other operating conditions, engine 12 is maintained in an off state while motor 16 is operated to charge energy storage device 14. For example, motor 16 receives wheel torque from drive wheel 24 as indicated by arrow 26 where the motor converts kinetic energy of the vehicle to electrical energy for storage at energy storage device 14 as indicated by arrow 28. This operation is referred to as regenerative braking of the vehicle. Thus, motor 16 can provide a generator function in some embodiments. However, in other embodiments, generator 18 instead receives wheel torque from drive wheel 24, where the generator converts kinetic energy of the vehicle to electrical energy for storage at energy storage device 14 as indicated by arrow 30.

During other operating conditions, engine 12 is operated by combusting fuel received from fuel system 20 as indicated by arrow 32. For example, engine 12 is operated to propel the vehicle via drive wheel 24 as indicated by arrow 34 while motor 16 is deactivated. During other operating conditions, both engine 12 and motor 16 are operated to propel the vehicle via drive wheel 24 as indicated by arrows 34 and 26, respectively. A configuration where both engine 12 and motor 16 selectively propel the vehicle is referred to as a parallel type vehicle propulsion system. In some embodiments, motor 16 propels the vehicle via a first set of drive wheels and engine 12 propels the vehicle via a second set of drive wheels.

In other embodiments, PHEV 10 is configured as a series type vehicle propulsion system, whereby engine 12 does not directly propel the drive wheels. Rather, engine 12 is operated to power motor 16, which in turn propels the vehicle via drive wheel 24 as indicated by arrow 26. For example, during select operating conditions, engine 12 drives generator 18, which in turn supplies electrical energy to motor 16 as indicated by arrow 36 and/or energy storage device 14 as indicated by arrow 30. As another example, engine 12 is operated to drive motor 16 which in turn provides a generator function to convert the engine output to electrical energy, where the electrical energy is stored at energy storage device 14 for later use by the motor.

Fuel system 20 includes a fuel tank for storing fuel on-board the vehicle. For example, the fuel tank may store one or more liquid fuels such as gasoline, diesel, and alcohol fuels. These fuels are delivered from the fuel tank to engine 12 as indicated by arrow 32, whereby the engine combusts the delivered fuel to produce an engine output. The engine output may be used to propel the vehicle as indicated by arrow 34 and/or to recharge energy storage device 14 via motor 16 or generator 18.

In some embodiments, energy storage device 14 is configured to store electrical energy that is supplied to other electrical loads residing on-board the vehicle (other than motor 16), including cabin heating and air conditioning, engine starting, headlights, cabin audio and video systems, etc.

Controller 22 may send control signals to and receive sensory feedback information from one or more of engine 12, energy storage device 14, motor 16, generator 18, and fuel system 20.

Energy storage device 14 periodically receives electrical energy from a power source 38 residing external the vehicle (e.g. not part of the vehicle) as indicated by arrow 40. During a recharging operation, the electrical energy may be supplied to energy storage device 14 from power source 38 via an electrical energy transmission cable 42. In this way, motor 16 may propel the vehicle by utilizing an energy source (e.g., electrical energy) other than the fuel utilized by engine 12. Controller 22 can identify the amount of electrical energy stored at energy storage device 14 (i.e., the SOC of the energy storage device).

Fuel system 20 periodically receives fuel from a fuel source residing external the vehicle. For example, fuel system 20 may be refueled by receiving fuel via a fuel dispensing device 44 as indicated by arrow 46.

Figure 2A:
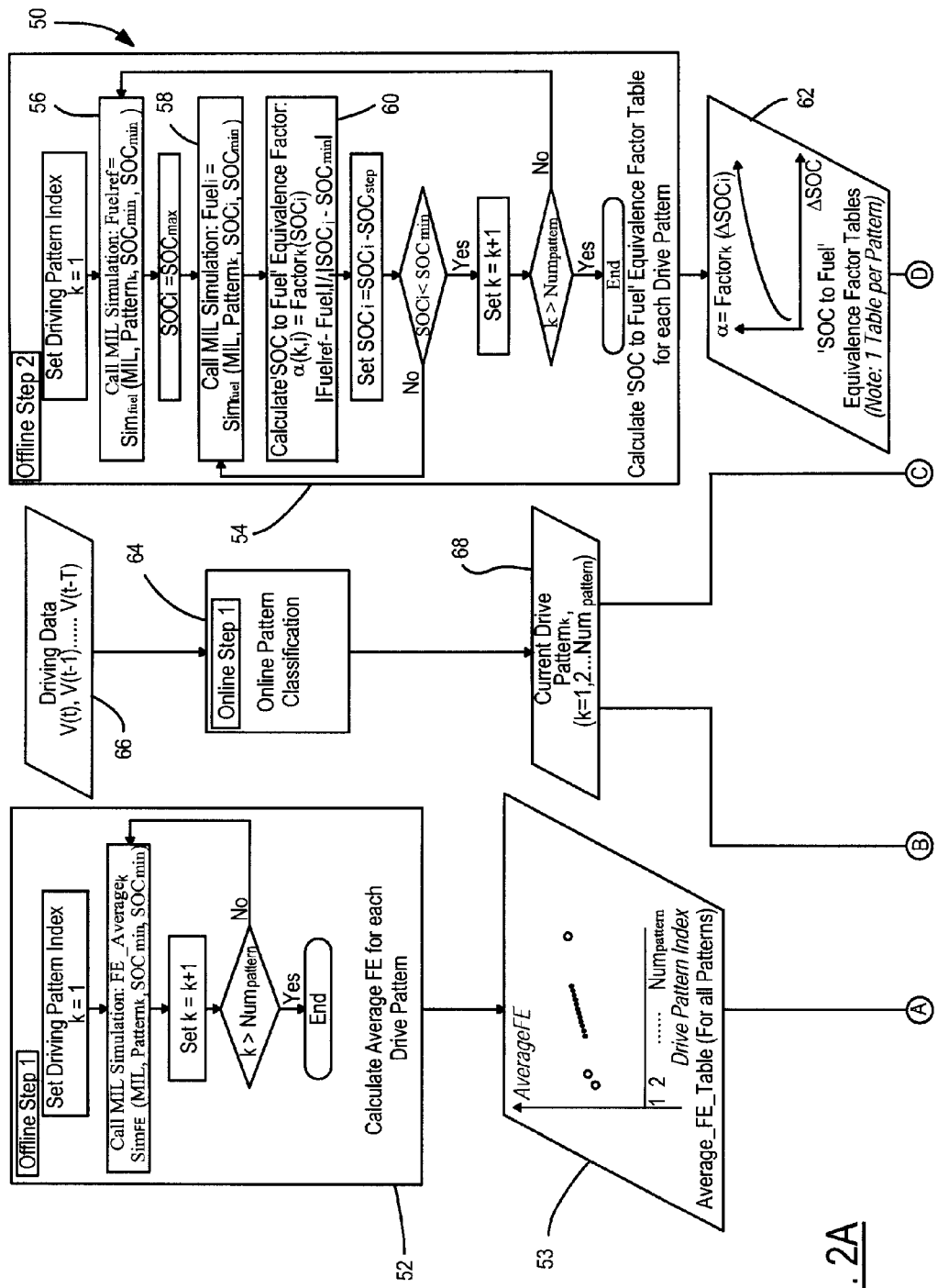
FIG. 2 illustrates a flowchart describing operation of a method of control for providing distance to empty ("DTE") and equivalent trip fuel economy ("equivalent trip FE") information for a PHEV in accordance with an embodiment of the present invention.
Figure 2B:
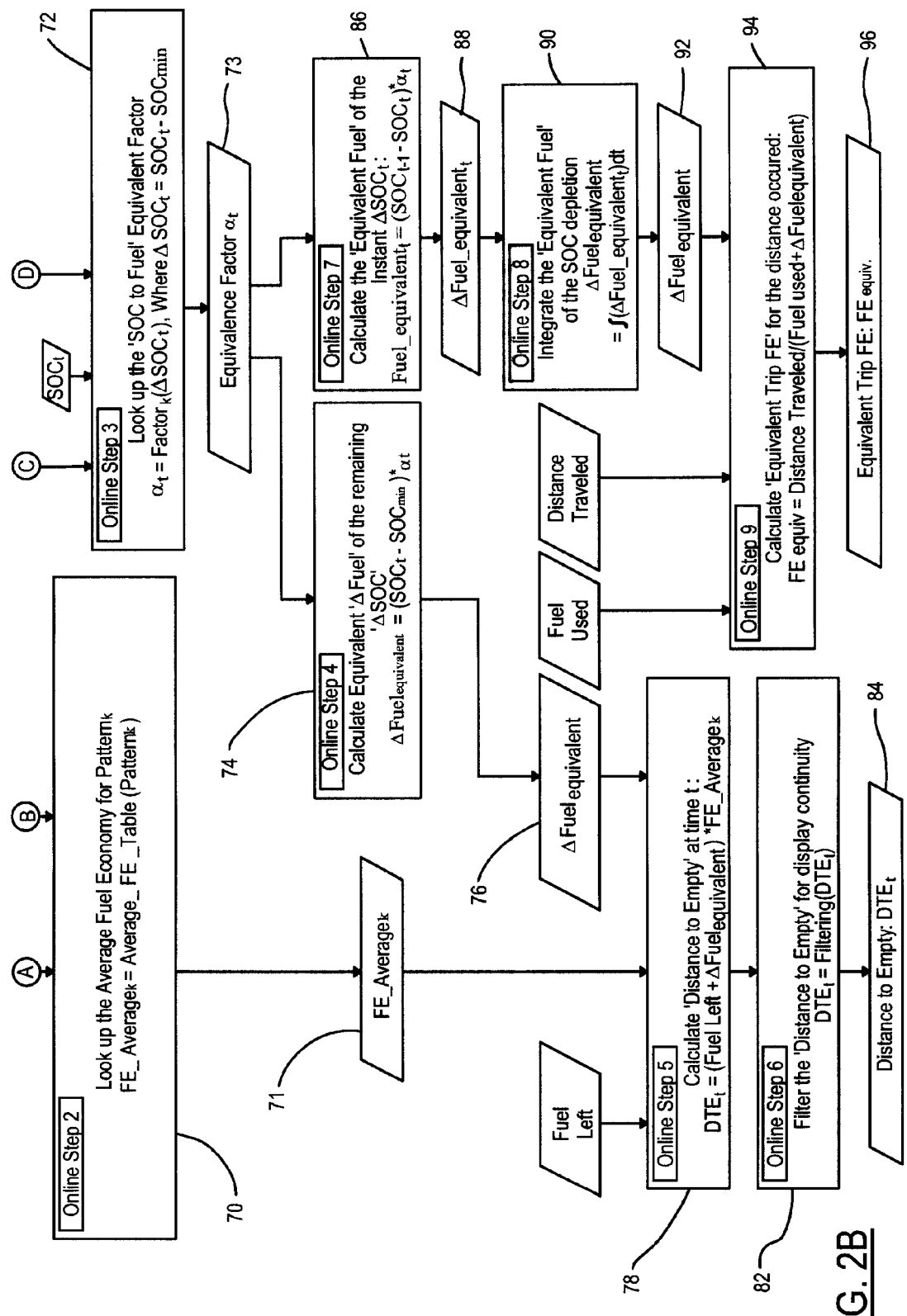

Referring now to FIG. 2, a flowchart 50 describing operation of a method of control for providing DTE and equivalent trip FE information for a PHEV such as PHEV 10 in accordance with an embodiment of the present invention is shown. The method is described with reference to an embodiment of PHEV 10 in which energy storage device 14 is a battery.

Flowchart 50 represents control logic which may be implemented by controller 22 using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used.

The method is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence. The illustrated functions may be modified or in some cases omitted without departing from the spirit or scope of the present invention.

Before turning to the details of the operation shown in flowchart 50 of FIG. 2, the following is noted about the method of control for providing DTE and equivalent trip FE information for a PHEV in accordance with an embodiment of the present invention. The method of control incorporates two existing techniques: an existing driving pattern identification method; and a PHEV model-in-the-loop (MIL) that represents the actual PHEV plant and controllers.

Regarding the existing driving pattern identification method, it is known that fuel efficiency is connected to individual driving styles, roadway types, and traffic congestion levels. A set of standard drive patterns, called facility-specific cycles, have been developed to represent passenger car and light truck operations over a broad range of facilities and congestion levels in urban areas. (See, for instance, Sierra Research, '*SCF Improvement—Cycle Development*', Sierra Report No. SR2003-06-02 (2003).) Driving styles have been captured in these standard drive patterns as well. For example, for the same roadway type and traffic level, different drivers may lead to different drive patterns. An online driving pattern identification method that automatically detects real-world driving condition and driving style and recognizes it as one of the standard patterns has been developed. (See, for example, Jungme Park, ZhiHang Chen, Leonidas Kiliaris, Ming Kuang, Abul Masrur, Anthony Phillips, Yi L. Murphey, '*Intelligent Vehicle Power Control based on Machine Learning of Optimal Control Parameters and Prediction of Road Type and Traffic Congestions*', IEEE Transactions on Vehicular Technology, 17 Jul. 2009, Volume 58, Issue 9.) This online driving pattern method is based on machine learning using Neutral Network and its accuracy has been proven by simulations.

Regarding the PHEV MIL, which represents the actual PHEV plant and controllers, a high-fidelity PHEV MIL with built-in VSC containing energy management algorithms has been developed. The MIL simulation can accurately compute the PHEV fuel consumption if given the following settings: a driving pattern represented by typical driving cycles; cycle beginning SOC; and cycle ending SOC. The fuel simulation can be represented by a function 'SIM' with four arguments as follows: Fuel=SIM(MIL, DrivingPattern, $SOC_{beginning}$, $SOC_{ending}$) where Fuel is the fuel consumption in the MIL cycle simulation, MIL is an MIL with PHEH plant and controller embedded, DrivingPattern is the drive pattern, $SOC_{beginning}$ is the cycle beginning SOC, and $SOC_{ending}$ is the cycle ending SOC.

Now turning to the details of the operation shown in flowchart 50 of FIG. 2, it is initially noted that the method of control for providing DTE and equivalent trip FE information for a PHEV in accordance with an embodiment of the present invention includes multiple steps having both offline and online phases. In particular, the method of control includes two offline steps to save online computation and eight online steps with relatively minimal computation. The following explains each step in detail.

In offline step1 shown in block 52 (descriptively labeled "Calculate Average FE for each Drive Pattern"), the average fuel economy in MPG for each drive pattern assuming charge sustaining at the minimum SOC is calculated. This is done by calling a MIL simulation using the following equation: $FE\_Average_k$=SIM(MIL, $DrivingPattern_k$, $SOC_{min}$, $SOC_{min}$). $SOC_{min}$ is the minimum SOC of the PHEV. This information is required for the DTE calculation. The average fuel economy (FE_Average) varies with different driving patterns (e.g., $FE\_Average_k$ is a function of $DrivingPattern_k$, $FE\_Average_{k+1}$ is a function of $DrivingPattern_{k+1}$, etc.) so that the DTE prediction can be timely updated upon the current driving condition to fit the driver's perception. The calculated results are stored in a CAL table 53 (descriptively labeled "Average_FE_Table (For all Patterns)" to be used online.

In offline step2 shown in block 54 (descriptively labeled "Calculate 'SOC to Fuel' Equivalence Factor Table for each Drive Pattern"), 'SOC to Fuel' equivalence factor table for each drive pattern is constructed. This process includes multiple sub-steps which are illustrated in block 54. Initially, for a given driving pattern (e.g., DrivingPattern$_k$), a charge-sustaining MIL simulation is called as a reference with both beginning and ending SOCs set equal to the minimum SOC (SOC$_{min}$) which provides: Fuel$_{ref}$=SIM(MIL, DrivingPattern$_k$, SOC$_{min}$, SOC$_{min}$) as shown in sub-block 56.

Under the same driving pattern, MIL simulations with the same ending SOC$_{min}$ but with different beginning SOCs are then called as shown in sub-block 58. For example, setting the beginning SOC to SOC$_t$ (where the remaining charge '$\Delta$SOC' is denoted as '$\Delta$SOC'=SOC$_t$−SOC$_{min}$) provides: Fuel=SIM (MIL, DrivingPattern$_k$, SOC$_t$, SOC$_{min}$).

Figure 3:
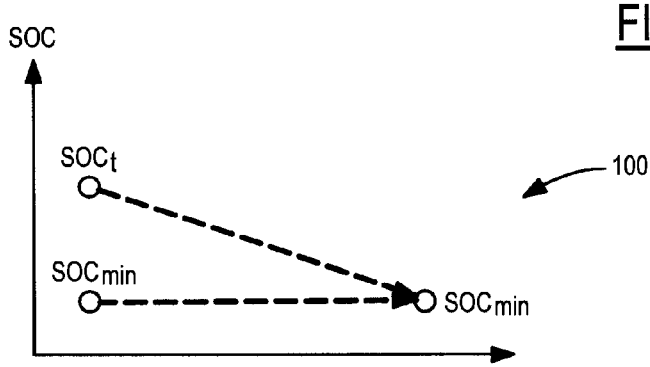
FIG. 3 illustrates a plot in regards to a process for calculating 'SOC to fuel' equivalent factors carried out by the method of control.

With reference to FIG. 3, a plot 100 of the two above noted simulations (i.e., Fuel$_{ref}$ in sub-block 56 and Fuel in sub-block 58) is shown. As can be understood from plot 100, for the same travel distance, one spent more electricity ('$\Delta$SOC') and the other spent more fuel ('$\Delta$Fuel'). (Note that the straight lines in plot 100 simply connect the beginning and ending SOCs for simple illustration and do not represent the SOC depletion rate.) Such $\Delta$SOC and $\Delta$Fuel can be viewed as 'equivalent' in achieving identical driving distance. Thus, for each specific driving pattern and for a specific remaining charge $\Delta$SOC, a 'SOC to Fuel' equivalence factor $\alpha$ is calculated in sub-block 60 using the following equation:

$$\alpha = \text{Factor}_k(SOC_t) = \frac{\Delta\text{Fuel}}{\Delta SOC} = \left|\frac{\text{Fuel}_{ref} - \text{Fuel}}{SOC_t - SOC_{min}}\right|$$

The calculations of sub-blocks 58 and 60 for a given driving pattern are repeated for each different beginning SOC as shown in block 54. That is, the steps of sub-blocks 58 and 60 shown with reference to plot 100 of FIG. 3 are iterated by sweeping every beginning SOC across the entire SOC range.

Figure 4:
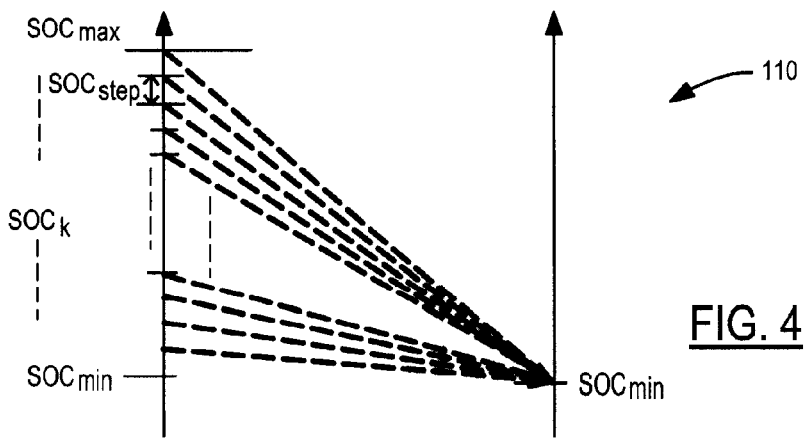
FIG. 4 illustrates a plot in regards to a process for calculating the equivalent factors for different SOC values carried out by the method of control.

FIG. 4 illustrates a plot 110 of such iterations for a given driving pattern with the SOC grid size being denoted as 'SOC$_{step}$'. (Again, the straight lines in plot 110 simply connect the beginning and ending SOCs for simple illustration and do not represent the SOC depletion rate.)

Upon completion of the above procedures on a given driving pattern, a table is constructed to represent the 'SOC to Fuel' equivalence factors as a function of $\Delta$SOC for the given driving pattern. As shown in block 54, the above procedures are iterated for all driving patterns to thereby produce a distinct 'Equivalence Factor Table' 62 for each driving pattern (descriptively labeled "'SOC to Fuel' Equivalence Factor Tables"). For instance, if the number of driving patterns is 'NumPattern', then there are NumPattern of such tables 62.

In online step1 shown in block 64, an online driving pattern classification is carried out. At time t, a speed profile during time [t−T, t] is used to explore driving patterns from block 66. The algorithm recognizes the current driving pattern as one of standard drive patterns and outputs the current driving pattern as shown in block 68.

In online step2 shown in block 70, the 'Average Fuel Economy' corresponding to the current driving pattern (which was recognized in online step1 of block 64) is obtained from table 53. As indicated above, table 53 was constructed in offline step1 of block 52. For instance, if the current driving pattern is 'pattern$_k$', then online step2 shown in block 70 uses the equation FE_Average$_k$=Table(Pattern$_k$), where FE_Average$_k$ is the average fuel economy corresponding to the current driving pattern (pattern$_k$). The determined average fuel economy (i.e., FE_Average$_k$ corresponding to pattern$_k$) is then output from block 70 to block 71.

In online step3 shown in block 72, the 'SOC to Fuel' equivalent factor at time t (i.e., $\alpha_t$) for the current driving pattern is determined. Again, assuming the current driving pattern is pattern$_k$, the 'Equivalence Factor Table' 62 corresponding to pattern$_k$ is selected in online step3. As indicated above, tables 62 for all of the driving patterns were constructed in offline step2 of block 54. Online step3 shown in block 72 uses the equation $\alpha_t$=Factor$_k$($\Delta$SOC$_t$), where $\Delta$SOC$_t$=SOC$_t$−SOC$_{min}$ and $\alpha_t$ is the SOC to fuel equivalent factor at time t taken from the table 62 for the current driving pattern (i.e., pattern$_k$). The SOC to fuel equivalent factor at time t for the current driving pattern (i.e., $\alpha_t$ for pattern$_k$) is then output from block 72 to block 73.

After the completion on online steps1-3 shown in blocks 64, 70, and 72, respectively, online steps4-6 shown in blocks 74, 78, and 82, respectively, are performed to calculate the DTE (i.e., the distance to empty) value for the PHEV.

In online step4 shown in block 74, the equivalent '$\Delta$Fuel' of the remaining '$\Delta$SOC' is calculated in accordance with the following equation: $\Delta$Fuel$_{equivalent}$=(SOC$_t$−SOC$_{min}$)*$\alpha_t$. The determined equivalent $\Delta$Fuel (i.e., $\Delta$Fuel$_{equivalent}$) is output from block 74 to block 76.

In online step5 shown in block 78, the distance to empty value at time t (i.e., 'DTE$_t$') is calculated in accordance with the following equation: DTE$_t$=(Fuel Left+$\Delta$Fuel$_{equivalent}$) *FE_Average$_k$.

In online step6 shown in block 82, the DTE value at time t determined in block 78 is filtered for display continuity in accordance with the equation: DTE$_t$=Filtering(DTE$_t$). This calibratable filtering function is to smooth out discontinuities of the DTE readouts when the PHEV switches between roadway types. If no pattern change is detected, then the filtering remains inactive. The determined and possibly filtered DTE$_t$ is output from block 82 to block 84.

In parallel to online steps4-6 shown in blocks 74, 78, and 82, respectively, online steps7-9 shown in blocks 86, 90, and 94, respectively, are performed to calculate the equivalent trip FE (i.e., the equivalent trip fuel economy information) for the PHEV.

In online step7 shown in block 86, instant 'equivalent fuel' for the instant $\Delta$SOC$_t$ is calculated in accordance with the following equation: $\Delta$fuel_equivlalent$_t$=(SOC$_{t-1}$−SOC$_t$)*$\alpha_t$. The equivalent fuel for the instant $\Delta$SOC$_t$ (i.e., $\Delta$fuel_equivlalent$_t$) is then output from block 86 to block 88.

In online step8 shown in block 90, the 'Equivalent Fuel' for the SOC depletion during the entire trip is calculated using integration in accordance with the following equation: $\Delta$Fuel$_{equivalent}$=∫($\Delta$fuel_equivlalent$_t$)dt. The equivalent fuel for the SOC depletion during the entire trip (i.e., $\Delta$Fuel$_{equivalent}$) is then output from block 90 to block 92.

In online step9 shown in block 94, the 'Equivalent Trip FE' for the distance occurred is calculated in accordance with the following equation: FE$_{equiv}$=distance traveled/(Fuel used+ $\Delta$Fuel equivalent). The equivalent trip FE for the distance occurred (i.e., FE$_{equiv}$) is then output from block 94 to block 96.

As described, the external inputs (i.e., SOC$_t$, fuel left, fuel used, and distance traveled) used for the various calculations are easy to measure and/or exist already in the PHEV. For example, the 'fuel left' input can be measured by a sensor. The 'fuel used' input can be determined from intermediate step in existing economy calculation, determining how long since last reading and inferring how much fuel was used at that current rate, and then added to previous value. The 'Trip Distance' (i.e., the distance traveled) input can be determined in similar manner with speed. These 'existed' data inputs are not labeled in flowchart 50.

In sum, the input variables used for the online calculations are accessible through the vehicle Electronic Control Units, vehicle gauges, OBD interface, or via sensors. These accessible input variables include fuel used, fuel left, distance traveled, current SOC, beginning and ending SOC, and average fuel economy. The accessible output readouts are distance to empty (DTE) and equivalent trip fuel economy (equivalent trip FE).

The method of control for providing DTE and equivalent trip FE information for a PHEV in accordance with an embodiment of the present invention has now been described.

The method of control may provide a benefit of high accuracy as the method provides accurate readouts as the method establishes the equivalent conversion rate between 'fuel' and 'electricity' by taking into account the following factors: driving condition; energy management strategy—the VSC has been embedded in the MIL simulations; and SOC—the offline computations cover the entire SOC range.

The method of control may provide the benefit of being cost effective as: minimal or no hardware costs are added; any software development effort is reduced by leveraging existing drive pattern identification algorithms and offline simulation techniques; and vehicle testing costs are saved by using high-fidelity model-in-the-loop.

The method of control may provide the benefit of having readiness for implementation as: minimal or no software interface change is required for existing PHEV VSC; and minimum online computation required—most computation is done offline.

The method of control may provide the benefit of being applicable to any PHEV configuration.

The method of control may provide the benefit of the 'Equivalent Trip FE' readout providing users an informative feedback on how efficient the PHEV has performed. Further, the 'Equivalent Trip FE' readout can also be used to determine another useful readout of 'Equivalent Fuel Saved from Battery Depletion' (i.e., $Fuel\_Saved_{equiv}$). In particular, the $Fuel\_Saved_{equiv}$ can be determined using the following equation:

$$Fuel\_Saved_{equiv} = \frac{Miles\_Traveled}{Equivalent\_Trip\ F.E.} - Fuel\_Used_{actual}$$

It is further pointed out that the method of control may have the following additional complimentary benefit. The equivalence factor tables can be used for Fuel Economy adjustment for HEV cycle tests (or simulations) that have imbalanced beginning and ending SOCs.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed:

1. A powertrain for a hybrid electric vehicle, the powertrain comprising:
    an engine and a fuel tank;
    a battery; and
    a controller configured to determine a distance to empty value as a sum of fuel in the fuel tank and a battery equivalent amount of fuel, the sum multiplied by an average fuel economy of the vehicle based on a driving condition of the vehicle.

2. The powertrain of claim 1 wherein:
    the controller is further configured to determine the battery equivalent amount of fuel as a function of an equivalence factor based on a current state of charge (SOC) of the battery and the driving condition.

3. The powertrain of claim 1 wherein:
    the controller is further configured to identify the driving condition of the vehicle from a plurality of possible driving conditions based on sensed information of the vehicle.

4. The powertrain of claim 3 wherein:
    each possible driving condition is respectively associated with an average fuel economy of the vehicle.

5. The powertrain of claim 1 wherein:
    the distance to empty value is indicative of the maximum travel distance of that the vehicle may travel until either the fuel tank is refueled or the battery is recharged.

6. The powertrain of claim 1 wherein:
    the controller is further configured to display the distance to empty value on a display of the vehicle.

7. The powertrain of claim 6 wherein:
    the controller is further configured to display the distance to empty value in either miles or kilometers.

8. The powertrain of claim 1 wherein:
    the controller is further configured to determine an equivalent trip fuel economy value as the distance traveled by the vehicle divided by the sum of used fuel from the fuel tank and a battery equivalent amount of used fuel from the battery.

9. The powertrain of claim 8 wherein:
    the controller is further configured to determine the battery equivalent amount of used fuel as a function of an equivalence factor based on a current state of charge (SOC) of the battery and the driving condition.

10. The powertrain of claim 8 wherein:
    the equivalent trip fuel economy value is indicative of the efficiency of the vehicle in using fuel from the fuel tank and electrical energy from the battery in travelling over the distanced traveled.

11. The powertrain of claim 8 wherein:
    the controller is further configured to display the equivalent trip fuel economy value on a display of the vehicle.

12. The powertrain of claim 11 wherein:
    the controller is further configured to display the equivalent trip fuel economy value in either miles or kilometers per unit of the sum of used fuel from the fuel tank and the battery equivalent amount of used fuel from the battery.

13. The powertrain of claim 8 wherein:
    the controller is further configured to determine an equivalent amount of fuel saved from battery depletion value as being the sum of the negative of the used fuel from the fuel tank and the quotient of the distance traveled by the vehicle divided by the equivalent trip fuel economy value.

14. A hybrid electric vehicle comprising:
    a fuel tank;
    a battery; and a controller configured to generate for output to a driver of the vehicle a distance to empty value as a sum of fuel in the fuel tank and a battery equivalent amount of fuel in the battery, the sum multiplied by an average fuel economy of the vehicle based on a driving condition of the vehicle.

15. The vehicle of claim 14 wherein:
the controller is further configured to generate an equivalent trip fuel economy value as the distance traveled by the vehicle divided by the sum of used fuel from the fuel tank and a battery equivalent amount of used fuel from the battery.

16. The vehicle of claim 15 wherein:
the controller is further configured to generate each of the battery equivalent amount of fuel and the battery equivalent amount of used fuel as a function of an equivalence factor based on a current state of charge (SOC) of the battery and the driving condition.

17. The vehicle of claim 15 wherein:
the controller is further configured to generate an equivalent amount of fuel saved from battery depletion value as being the sum of the negative of the used fuel from the fuel tank and the quotient of the distance traveled by the vehicle divided by the equivalent trip fuel economy value.

18. A method comprising:
sensing by a controller in communication with a fuel tank and a battery of a hybrid electric vehicle an amount of fuel in the fuel tank and an amount of energy in the battery;
identifying by the controller a battery equivalent amount of fuel in the battery based on the amount of energy in the battery;
sensing the vehicle, with sensor hardware in communication with the controller, as the vehicle is being driven for the controller to identify a current driving condition of the vehicle; and
generating by the controller for receipt by a driver of the vehicle a distance to empty value as a sum of the fuel in the fuel tank and the battery equivalent amount of fuel, the sum multiplied by an average fuel economy of the vehicle based on the current driving condition.

19. The method of claim 18 further comprising:
generating by the controller an equivalent trip fuel economy value as the distance traveled by the vehicle divided by the sum of used fuel from the fuel tank and a battery equivalent amount of used fuel from the battery.

20. The method of claim 18 wherein:
the battery equivalent amount of fuel is generated as a function of an equivalence factor based on a current state of charge (SOC) of the battery and the driving condition.

* * * * *